US010866869B2

(12) United States Patent
Li

(10) Patent No.: US 10,866,869 B2
(45) Date of Patent: Dec. 15, 2020

(54) METHOD TO PERFORM CRASH AND FAILURE RECOVERY FOR A VIRTUALIZED CHECKPOINT PROTECTED STORAGE SYSTEM

(71) Applicant: VMware, Inc., Palo Alto, CA (US)

(72) Inventor: Cheng Li, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 150 days.

(21) Appl. No.: 16/249,719

(22) Filed: Jan. 16, 2019

(65) Prior Publication Data
US 2020/0226035 A1 Jul. 16, 2020

(51) Int. Cl.
*G06F 11/14* (2006.01)
*G06F 16/23* (2019.01)

(52) U.S. Cl.
CPC ...... *G06F 11/1474* (2013.01); *G06F 11/1471* (2013.01); *G06F 16/2365* (2019.01); *G06F 2201/84* (2013.01)

(58) Field of Classification Search
CPC ............ G06F 11/0745; G06F 11/1402; G06F 11/1415; G06F 11/1435; G06F 11/1446; G06F 11/1448; G06F 11/1458; G06F 11/1469; G06F 11/1471; G06F 11/1474; G06F 2201/84; G06F 16/2365; G06F 16/128; G06F 3/0619; G06F 9/466
See application file for complete search history.

(56) References Cited

U.S. PATENT DOCUMENTS

| | | | | |
|---|---|---|---|---|
| 4,819,156 A * | 4/1989 | DeLorme | ............ | G06F 11/1471 714/15 |
| 5,333,303 A * | 7/1994 | Mohan | ................ | G06F 11/1471 714/20 |
| 5,561,795 A * | 10/1996 | Sarkar | .................. | G06F 11/1471 |
| 5,845,292 A * | 12/1998 | Bohannon | ........... | G06F 11/1469 |
| 6,119,128 A * | 9/2000 | Courter | ............... | G06F 16/2358 |
| 7,613,743 B1 * | 11/2009 | Giampaolo | ......... | G06F 11/1474 |
| 7,865,471 B1 * | 1/2011 | Stagg | ................... | G06F 11/1471 707/640 |
| 8,768,891 B2 * | 7/2014 | Schreter | .................. | G06F 16/00 707/682 |
| 8,903,779 B1 * | 12/2014 | Holenstein | .......... | G06F 11/1469 707/685 |
| 2004/0260726 A1 * | 12/2004 | Hrle | ..................... | G06F 11/1466 |
| 2005/0278393 A1 * | 12/2005 | Huras | ................. | G06F 16/2358 |
| 2006/0010180 A1 * | 1/2006 | Kawamura | ......... | G06F 11/2076 |
| 2008/0162590 A1 * | 7/2008 | Kundu | ................ | G06F 11/1471 |
| 2008/0281865 A1 * | 11/2008 | Price | .................... | G06F 16/2343 |
| 2016/0154710 A1 * | 6/2016 | Wade | .................. | G06F 11/1469 714/19 |
| 2018/0144015 A1 * | 5/2018 | Mittur Venkataramanappa | .......... | G06F 11/1471 |
| 2020/0034251 A1 * | 1/2020 | Antonopoulos | ........ | G06F 16/23 |

* cited by examiner

*Primary Examiner* — Gabriel Chu
(74) *Attorney, Agent, or Firm* — Patterson + Sheridan, LLP

(57) ABSTRACT

A method for recovering content stored in virtual machines is provided. This method includes isolating a data object to be recovered from a crash or error from incoming and outstanding processes; backing out uncommitted changes of the data object based on undo logs; determining a most recent checkpoint for the data object; reinitializing the data object from the most recent checkpoint to produce a reinitialized data object; and populating the reinitialized data object to produce a recovered data object by replaying, from a write-ahead log.

20 Claims, 11 Drawing Sheets

Write-ahead Log 502

| Entry $504_1$ | Entry $504_2$ | Entry $504_3$ | Entry $504_4$ | Entry $504_5$ | |
|---|---|---|---|---|---|
| Free PBA_k<br>SeqNbr=4<br>BatchNbr=3 | Write LBA_x (PBA_y)<br>SeqNbr=5<br>BatchNbr=3 | Write LBA_x (PBA_y)<br>SeqNbr=5<br>BatchNbr=3 | Confirm Write LBA_x<br>BatchNbr=6 | Free PBA_m<br>SeqNbr=7 | ... |

FIG. 5A

Delete Log 506

| Entry $508_1$ | Entry $508_2$ | Entry $508_3$ | |
|---|---|---|---|
| PBA tuple1:<br>(0:0, 0:0x1000, 0:0x4000) processed offset: 65536<br>Null, SeqNbr=10 | PBA tuple1:<br>(0:0x1000, 0:0x4000, 0:0x8000) processed offset : 0<br>Null, SeqNbr=11 | Write LBA_x PBA tuple1:<br>(0:0x8000, 0:0x10000, 0:0x1c000) processed offset: 0<br>Null, SeqNbr=12 | ... |

FIG. 5B

Transaction Log Entry 510

| LBA (64 bit) | PBA (64 bit) | Length (64 bit) | Checksum (32 bit) | seqNbr (64 bit) | AllocInfo (128 bit) |
|---|---|---|---|---|---|

FIG. 5C

Transaction Log Entry 512
- Batch sequence number (64 bit)

FIG. 5D

Transaction Log Entry 514
- Freed PBA (64 bit)
- Transaction ID (64 bit)

FIG. 5E

Transaction Log Entry 516
- PBA tuple (64bit x 3 = 192bit)
- Received status (32bit)
- Processed offset (64bit)

FIG. 5F

Transaction Log Entry 518
- Internal Operation Type
- International Operation Data

FIG. 5G

METHOD TO PERFORM CRASH AND FAILURE RECOVERY FOR A VIRTUALIZED CHECKPOINT PROTECTED STORAGE SYSTEM

BACKGROUND

In a virtualized computing environment, virtual disks storing data of virtual machines (VMs) running in a host computer system ("host") are typically represented as files in the host's file system. System or host crashes due to power outages and software errors (e.g., no memory, transient inaccessible storage or remote site, etc.) may corrupt VM data and related metadata. Frequent backup of VM data and related metadata as different checkpoints (also referred to as snapshots) at different times can mitigate this corruption. However, frequent backup increases storage costs and creates an adverse impact on performance, particularly read performance, because each read will have to potentially traverse multiple checkpoints in a random manner due to the checkpoints being stored in a hierarchy. For example, each subsequent checkpoint may only include data that has changed since a previous checkpoint (referred to as a delta), and therefore, a disk controller may need to read multiple checkpoints in the hierarchy to read data of the VM.

BRIEF DESCRIPTION OF DRAWINGS

FIG. 5A-5G are block diagrams representing the structure of various logs and log entries of a virtualized checkpoint protected storage system, according to embodiments of the present disclosure.

DETAILED DESCRIPTION

According to some embodiments, different checkpoints for the same virtual disk are stored in the same storage object, which may take the form of a file in a host file system, a file in a network file system, an object storage system provisioned as a virtual storage area network (SAN) object, a virtual volume object, or a cloud storage object. Similarly, metadata of different checkpoints for the same virtual disk are stored in the same storage object, and log data of different checkpoints for the same virtual disk are stored in the same storage object. As a result, the number of different storage objects that are managed for checkpoints do not increase proportionally with the number of checkpoints taken.

In addition, any one of the multitude of persistent storage backends can be selected as the storage back-end for the storage objects containing data for the checkpoints. As a result, the form of the storage objects containing data for the checkpoints may be selected according to user preference, system requirement, checkpoint policy, or any other criteria. Another advantage is that the storage location of the read data can be obtained with a single read of the metadata storage object, instead of traversing metadata files of multiple checkpoints. As used herein, "snapshots" can be also referred herein as "checkpoints," and can be considered as persistent checkpoints each of which is immutable throughout its lifetime until it is deleted.

Embodiments presented herein provide a framework for performing crash and failure recovery for a virtualized checkpoint protected storage system. This framework includes quiescing a data object to be recovered from a crash or error. As used herein, "quiescing" generally refers to a process for pausing or altering a data object to achieve a consistent state in preparation for a recovery. After the data object has been quiesced, the data object undergoes a process of recovery. In some embodiments, the uncommitted changes of the data object are backed out based on undo logs and a most recent checkpoint for the data object is determined based on one or more point-in-time checkpoints related to the data object. The data object is re-initialized from the most recent checkpoint so the reinitialized data object includes the data and metadata from before the crash or error. The reinitialized data object is repopulated by replaying operations from a write-ahead log, so that the changes to the metadata part (e.g., B+ tree) of the data object before the crash or error and after the most recent checkpoint are applied to the reinitialized data object. The replay process does not overwrite any content already stored in the space manager 316.

Figure 1:
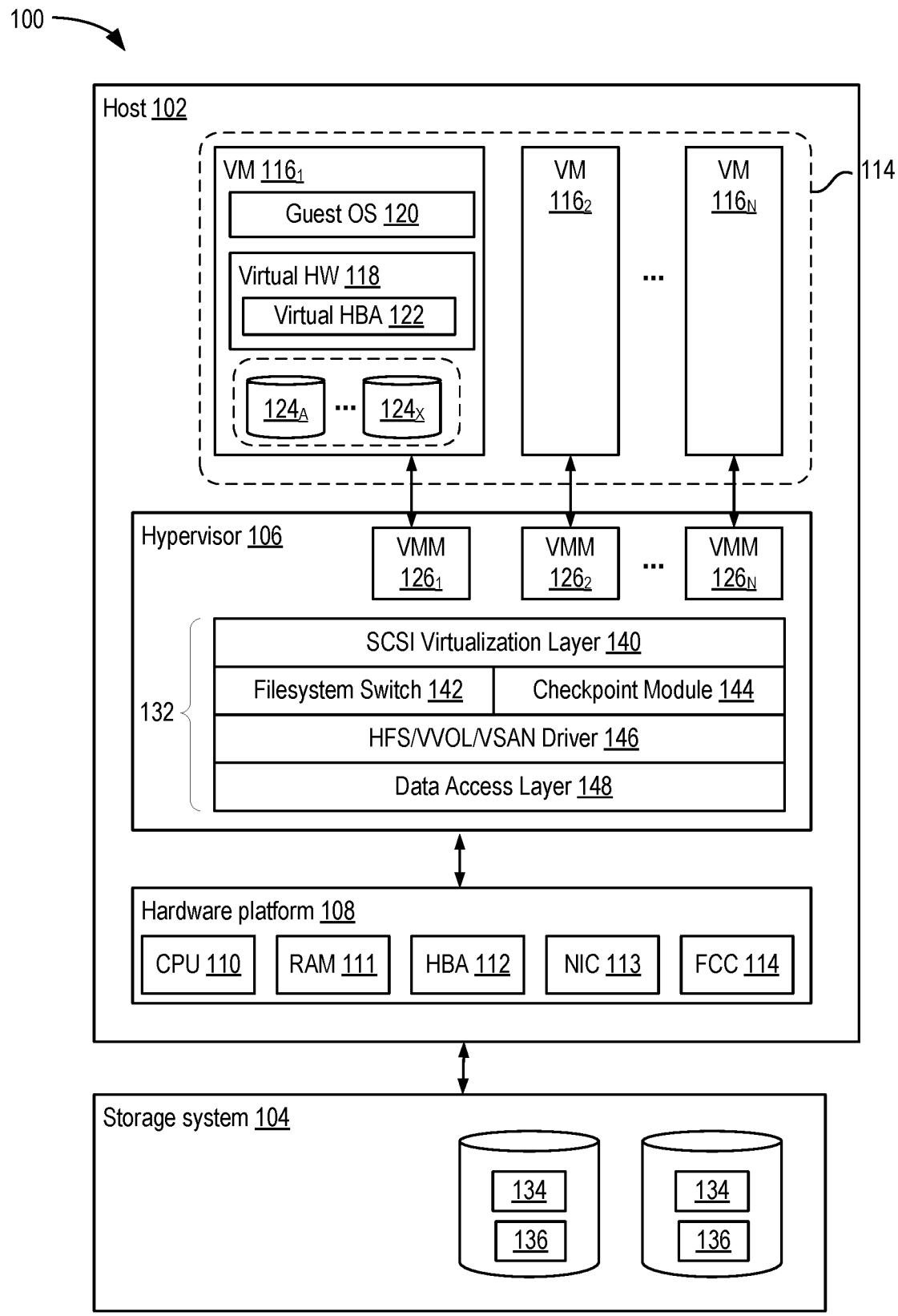
FIG. 1 is a block diagram that illustrates a computer system in which one or more embodiments may be utilized.

FIG. 1 is a block diagram that illustrates a computer system 100 in which one or more embodiments of the present disclosure may be implemented. Computer system 100 includes one or more hosts 102 configured to provide a virtualization layer that abstracts processor, memory, storage, and networking resources of a hardware platform 108 into multiple virtual machines (VMs) 116 that run concurrently on the same host 102. VMs 116 run on top of a software interface layer, referred to as a hypervisor 106 that enables sharing of the hardware resources of host 102 by VMs 116. One example of hypervisor 106 is a VMware ESXi hypervisor provided as part of the VMware vSphere solution made commercially available from VMware, Inc. In some embodiments, storage system 104 may be implemented as software-defined storage such as VMware Virtual SAN (VSAN) that clusters together server-attached hard disk drives and/or solid-state drives (HDDs and/or SSDs), to create a flash-optimized, highly resilient shared datastore designed for virtual environments. It should be noted that though certain techniques are described with respect to VMs, the techniques may similarly be applied to other virtual computing instances, such as containers, or even to physical computing devices.

Host 102 may comprise a general-purpose computer system having one or more virtual machines accessing data stored on a storage system 104 communicatively connected to host 102. Host 102 may be constructed on a conventional, typically server-class, hardware platform 108. Hardware platform 108 of host 102 may include conventional physical components of a computing device, such as a processor (CPU) 110, a memory 111 (volatile and/or non-volatile), a disk interface 112, a network interface card (NIC) 113, and a fiber channel connection (FCC) 114. Processor 110 is configured to execute instructions, for example, executable instructions that perform one or more operations described herein and may be stored in memory 111. Memory 111 and storage system 104 are devices allowing information, such as executable instructions, cryptographic keys, virtual disks, configurations, and other data, to be stored and retrieved. Memory 111 may include, for example, one or more random access memory (RAM) modules. Storage system 104 may include one or more locally attached storage devices, for example, one or more hard disk drives, flash memory modules, solid state drives, and optical disks. In some embodiments, storage system 104 may include a shared storage system having one or more storage arrays of any type such as a network-attached storage (NAS) or a block-based device over a storage area network (SAN). Disk interface 112, such as a host bus adapter (HBA), enables host 102 to communicate with a storage device, such as storage system 104, to store "virtual disks" that are accessed by VMs 116, as described later. Network interface 113 enables host 102 to communicate with another device via a communication medium, such as a communication network (not shown). An example of network interface 113 is a network adapter, also referred to as a Network Interface Card (NIC). A fiber channel connection 114 enables host 102 to communicate with storage area networks, servers, and other block storage systems.

While storage system 104 is typically made up of a plurality of disks, other forms of storage, such as solid-state non-volatile storage devices, may be used, and the use of the term, "disk" herein, should therefore not be construed as limited only to rotating disk storage media, but may also be construed to encompass solid state drives, or "SSDs." In some embodiments, storage system 104 may be comprised of high-density non-volatile memory. Furthermore, while storage system 104 is depicted as a separate, external component to host 102, storage system 104 may be internal to host 102, for example, a local storage device or locally attached storage.

As shown in FIG. 1, a hypervisor 106 is installed on top of hardware platform 108 and supports a virtual machine execution space 114 within which multiple virtual machines (VMs) $116_1$-$116_N$ may be instantiated and executed. Each such virtual machine $116_1$-$116_N$ implements a virtual hardware platform 118 that supports the installation of a guest operating system (OS) 120 which is capable of executing one or more applications (not shown). Examples of a guest OS 120 include any of the well-known commodity operating systems, such as Microsoft Windows, Linux, and the like. In each instance, guest OS 120 includes a native file system layer, for example, either an NTFS or an ext4 type file system layer. These file system layers interface with virtual hardware platforms 118 to access, from the perspective of guest operating systems 120, a data storage HBA, which in reality, is virtual HBA 122 implemented by virtual hardware platform 118 that provides the appearance of disk storage support (in reality, virtual disks $124_A$-$124_X$) to enable execution of guest OS 120 transparent to the virtualization of the system hardware. A virtual disk 124 exposes the same abstraction as a real (physical) disk, that is, a linear list of sectors; however, a virtual machine monitor (VMM) may choose to implement virtual disks 124 as regular files on the host. Although, from the perspective of guest operating systems 120, file system calls initiated by such guest operating systems 120 to implement file system-related data transfer and control operations appear to be routed to virtual disks $124_A$-$124_X$ for final execution, in reality, such calls are processed and passed through virtual HBA 122 to adjunct VMM layers $126_1$-$126_N$ that implement the virtual system support needed to coordinate operation with hypervisor 106. In particular, an HBA emulator of each VMM 126 functionally enables the data transfer and control operations to be correctly handled by hypervisor 106 which ultimately passes such operations through its various layers to true hardware HBAs 112 or NIC 113 that connect to storage system 104.

Hypervisor 106 includes a storage layer 132 that reprocesses input-output operations (IOs) issued by the guest OS 120 through the native file system layer, even though these IOs appear to the guest OS 120 as being routed to one or more virtual disks provisioned for VM 116(1) for final execution. At the top of the storage layer 132 is a Small Computer System Interface (SCSI) virtualization layer 140, which receives IOs directed at the issuing VM's virtual disk and translates them into IOs directed at one or more storage objects managed by hypervisor 106, e.g., virtual disk storage objects representing the issuing VM's virtual disk. A file system device switch (FDS) driver 142 examines the translated IOs from SCSI virtualization layer 140 and in situations where one or more checkpoints have been taken of the virtual disk storage objects, the IOs are processed by a checkpoint module 144.

The remaining layers of storage layer 132 are additional layers managed by hypervisor 106. HFS/VVOL/VSAN driver 146 represents one of the following depending on the particular implementation: (1) a host file system (HFS) driver in cases where the virtual disk and/or data structures relied on by checkpoint module 144 are represented as a file in a file system, (2) a virtual volume (VVOL) driver in cases where the virtual disk and/or data structures relied on by snapshot module 144 are represented as a virtual volume as described in U.S. Pat. No. 8,775,773, which is incorporated by reference herein in its entirety, and (3) a virtual storage area network (VSAN) driver in cases where the virtual disk and/or data structures relied on by checkpoint module 144 are represented as a VSAN object as described in U.S. patent application Ser. No. 14/010,275, which is incorporated by reference herein in its entirety. In each case, driver 146 receives the IOs passed through file system switch driver 142 and translates them to IOs issued to one or more storage objects, and provides them to data access layer 148 which transmits the IOs to storage system 104 through NIC 113 or through HBA 112.

In some embodiments, the SCSI virtualization layer 140 receives a data transfer and control operation (in the form of I/O commands, for example, intended for a virtual disk) from VMM layers $126_1$ to $126_N$, and converts the operations into file system operations that are understood by the file system switch driver 142 in order to access a file stored in underlying storage under the management of the file system switch driver 142 that represents virtual disk 124. The SCSI virtualization layer 140 then issues these file system operations to the file system switch driver 142. The file system switch driver 142, in general, manages creation, use, read, write, and deletion of files (e.g., such as .vmdk files representing virtual disks) stored on physical locations of, or in logical volumes or Logical Unit Numbers (LUNs) exposed by, storage system 104. The file system switch driver 142 converts the file system operations received from the SCSI virtualization layer 140 to raw SCSI operations, which are issued to a data access layer that applies command queuing and scheduling policies to the raw SCSI operations and ultimately sends the raw SCSI operations to components of physical hardware platform 108.

While storage layer 132 is depicted as part of a virtualized architecture, it should be recognized that embodiments of the present disclosure can be extended to other systems having a storage layer. For example, in an alternative embodiment, storage layer 132 may be a file system driver of an operating system that manages storage space persistently for locally attached storage.

It should be recognized that the various terms, layers and categorizations used to describe the virtualization components in FIG. 1 may be referred to differently without departing from their functionality or the spirit or scope of the invention. For example, VMMs 126 may be considered separate virtualization components between VMs 116 and hypervisor 106 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 118 may be merged with and into VMM 126 such that virtual host bus adapter 122 is removed from FIG. 1 (i.e., since its functionality is effectuated by a host bus adapter emulator within VMM 126).

In one embodiment, the storage layer 132 maintains on-disk storage metadata 134 for facilitating the dynamic allocation of storage blocks 136 (sometimes referred to as disk blocks, disk sectors, or sectors) and other operations on storage system 104. For example, storage layer 132 is configured to receive and/or execute space allocation requests for storage blocks 136 that can be used to handle requests to write data to storage system 104. In some embodiments, storage layer 132 uses storage metadata 134 for such tasks as remembering which storage blocks 136 are allocated and which storage blocks are free (e.g., bitmaps), or allowing quick random access to an arbitrary block in a particular file (e.g., key-value stores such as B-trees, Log-structured Merging (LSM) trees, rocksdb, and the like).

Figure 2:
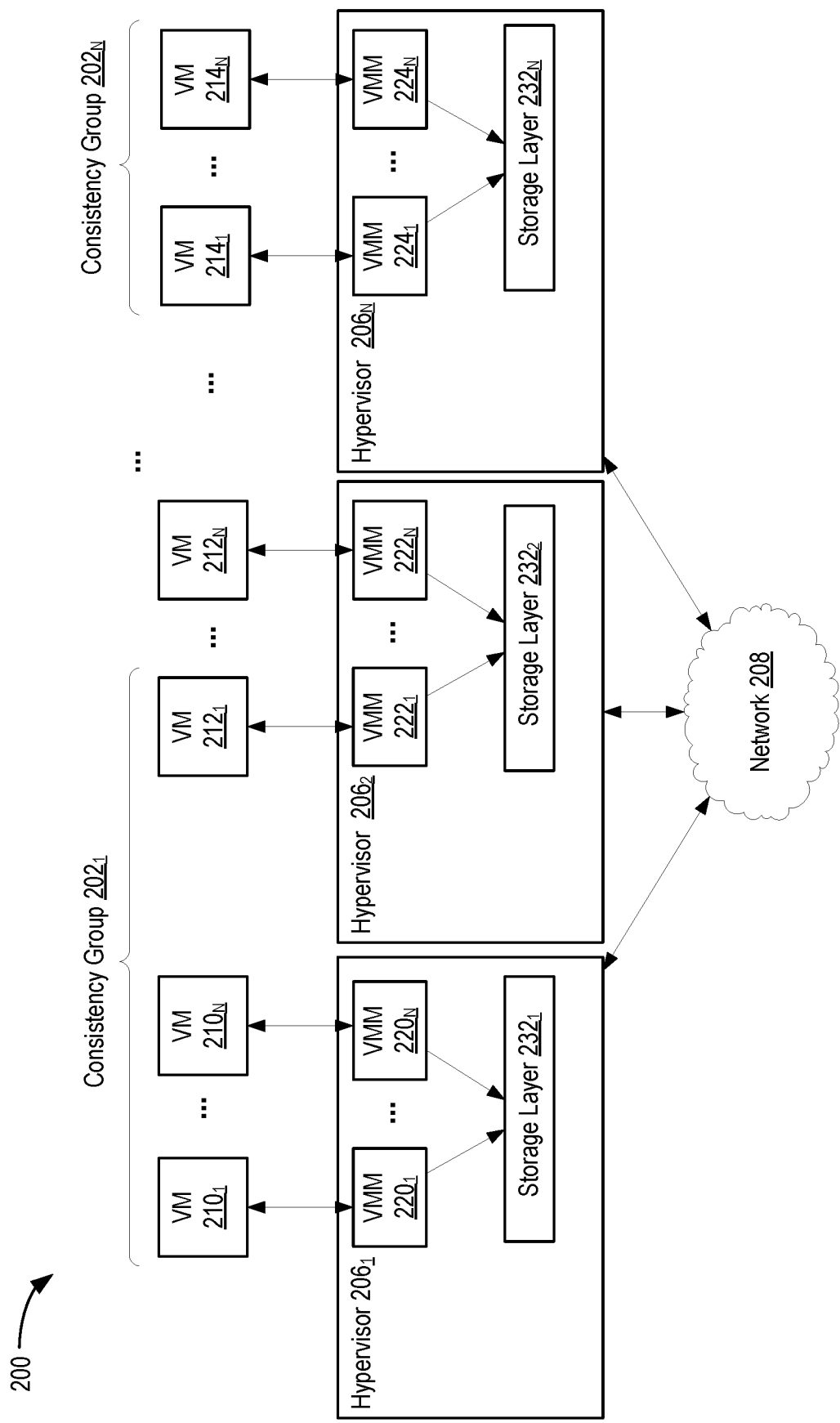
FIG. 2 is a system diagram of a hyper-converged storage system according to embodiments of the present disclosure.

FIG. 2 is a system diagram of a hyper-converged storage system according to an exemplary embodiment of the present disclosure. The hyper-converged storage system 200 protects VMs ($210_1$-$210_N$, $212_1$-$212_N$, and $214_1$-$214_N$) through consistency groups. VMs in each consistency group take managed and/or unmanaged snapshots and backups in a coordinated manner. A managed checkpoint is a checkpoint actively taken by a user through VM management interfaces, and an unmanaged checkpoint is a checkpoint of the virtual disks passively taken by a data protection policy. The data protection policy comprises parameters such as recovery point objective (RPO) (e.g., a maximum targeted period in which data might be lost in the event of a failure), recovery time objective (RTO) (e.g., a targeted duration of time within which a process must be restored after a failure), and retention period (e.g., how many history checkpoints to keep). Depending on these parameters, data protection policy runs a daemon that periodically takes checkpoints without interaction from the user. A consistency group is a group of objects that form high-level protected entities such as VMs. For example, a set of distributed database instances running in a set of VMs is a consistency group. To protect the entire database, the group requires application of data protection policy to each virtual disk backed by data objects of the storage system 104. It requires taking checkpoints of these objects as a whole at the same time, deleting group checkpoint at the same time, etc. Each consistency group is assigned with a priority, representing the proportional performance objectives of all the VMs in the consistency group. VMs in the higher priority parameters (e.g., RPO) requires different additional space for storing checkpoints. The storage system 104 performs space allocation and provisioning on the granularity of a consistency group.

In some embodiments, hyper-converged storage system 200 includes VMs $210_1$-$210_N$, $212_1$-$212_N$, and $214_1$-$214_N$ that are running on top of hypervisors $206_1$-$206_N$. Each hypervisor $206_1$-$206_N$ has VMMs $220_1$-$220_N$, $222_1$-$222_N$, and $224_1$-$224_N$ for each instantiated VM, and the hypervisors also have storage layers $232_1$-$232_N$ that process IOs from the VMs. In some embodiments, the hypervisors $206_1$-$206_N$ communicates with a network 208. The network can be a high-speed Ethernet within a local data center or wide-area network where hypervisors are geographically distributed. In some embodiments, VMs $210_1$-$210_N$ and $212_1$ are in consistency group $202_1$ while VMs $214_1$-$214_N$ are in consistency group $202_N$. Storage system 200 can have any number of consistency groups, and these consistency groups can comprise any combination of VMs, as shown with VMs $210_1$-$210_N$ and $212_1$ running on different hypervisors belonging to the same consistency group. Storage system 200 can also have any number of VMs running on top of any number of hypervisors.

Figure 3:
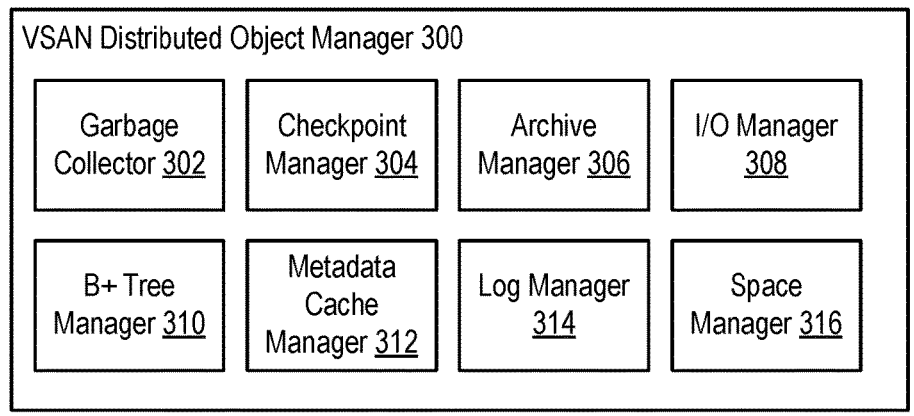
FIG. 3 is an illustration of a virtualized checkpoint protected storage system, according to embodiments of the present disclosure.

FIG. 3 is an illustration of a virtualized checkpoint protected storage system of the hypervisor 106 of FIG. 1, according to embodiments of the present disclosure. For example, VSAN distributed object manager 300 may be a component of HFS/VVOL/VSAN driver 146 of FIG. 1. The virtualized checkpoint protected storage system manages checkpoints of virtual disks of VMs, and in the embodiment illustrated herein, the virtual disk of a VM is assumed to be a file in the host file system and is referred herein as the data object. In other embodiments, the virtual disk may be represented by a VVOL object, a VSAN object, or other types of objects stores known in the art.

In some embodiments, the VSAN distributed object manager 300 has a variety of components, including a garbage collector 302, a checkpoint manager 304, an archive manager 306, an I/O manager 308, a B+ tree manager 310, a metadata cache manager 312, a log manager 314, and a space manager 316. Other embodiments of the VSAN distributed object manager 300 can include any number of other components and can include any combination of components.

In some embodiments, the space manager 316 manages space allocation and deallocation for the storage system 104 of FIG. 1. The space manager 316 uses markers to track allocated and deallocated space in the storage system 104, by using offsets for the physical location, also referred to as physical block addresses (PBA), of the allocated and deallocated space in the storage space of storage system 104.

In some embodiments, the archive manager 306 stores the descriptive information of the data object, such as object size, object address range, etc. The archive manager 306 also manages checkpoint information. This information includes the unique universal identifier (UUID) of the checkpoint, the physical block address where the checkpoint is stored in the storage system 104, properties of the checkpoint, such as whether the checkpoint is writable, the checkpoint creation time, and last access time of the checkpoint. The archive manager 306 also updates the information of the data object and checkpoint based on a two-phase commit protocol. Generally, a two-phase commit protocol ensures that information of the data object updates by writing successfully to a log, committing the updated information, and writing the commit as part of the log. For the recovery of state changes to the data object (such as creating a new checkpoint, deleting a checkpoint, closing a writable quiescing checkpoint) stored in the archive manager 306, unless the commit message is found, the entire transaction of the state change to the data object will be aborted as undo, otherwise marked as completed.

In some embodiments, the B+ tree manager 310 comprises a B+ tree data structure to manage the metadata and data of data objects. In some embodiments, the VSAN distributed object manager 300 uses a B+ tree to determine whether data of a previous checkpoint is located in storage, the nodes of the B+ tree representing the state of the data object at the time a checkpoint is taken. The VSAN distributed object manager 300 uses copy-on-write (COW) technique to track incremental delta changes since the last checkpoint in order to improve space efficiency. The COW B+ tree represents the entire address space that is updated since the last checkpoint. The B+ tree is used as the primary indexing data structure, which performs logical address to physical address translation. In other embodiments, the virtualized checkpoint protected storage system may use any type of data structure, including B-trees, B+ trees, Copy-on-write B+ trees (i.e., B+ trees which maintain node reference counts and do not have leaf chaining), LSM Trees, B-ε trees, and other tree-like data structures. Accordingly, in such embodiments, the B+ tree manager 310 comprises the appropriate structure to manage the different types of data structures. Details regarding the B+ tree are discussed below with reference to FIG. 4.

In some embodiments, the metadata cache manager 312 preserves metadata of the data object. The metadata cache manager 312 contains a dirty list and a clean list. From a new checkpoint, all overwritten (i.e., copy-on-write) nodes of the B+ tree managed by the B+ tree manager 310 are marked as being in a dirty state and stored in a dirty list. These nodes are persisted to disk at the next checkpoint and inserted into a clean list. When the clean list reaches a threshold, the cache manger 312 evicts the contents of the clean list based on date or any other customized metric.

In some embodiments, the garbage collector 302 reclaims the unused space back to the space manager 316. The garbage collector 302 periodically scans the allocated space of the storage system 104 and checks whether the addresses corresponding to the allocated space are referenced by any of the checkpoints recorded by the archive manager 306. If the garbage collector 302 finds a range of free address space not referenced by any valid checkpoint, the garbage collector 302 reclaims the free space for the space manager 316 and its free list. Additionally, the checkpoint deletion process leverages the garbage collector 302 to gather unreferenced PBAs that belong to deleted checkpoints.

In some embodiments, the VSAN distributed object manager 300 also comprises a lock manager (not shown). The lock manager manages the accessibility of the data object being recovered and comprises three components: a range lock, a read/write lock, and a barrier. The range lock is to provide exclusive access to a physical block address range. The read/write lock provides shared or exclusive access to an operation (e.g., I/O or control operations). A read request will acquire a read lock, and a write request will acquire a write lock. The barrier, like the read/write lock, has a shared mode and exclusive mode, and applies to the entire data object.

In some embodiments, the I/O manager 308 manages how the VSAN distributed object manager 300 handles input and output from VMs. The I/O manager 308 acquires various locks and walks through the B+ tree corresponding to the data object to perform address translation and to determine the physical location of the data. After an extending write (which is discussed in further detail below), the I/O manager 308 releases the various locks to allow other I/O requests to proceed.

In some embodiments, the checkpoint manager 304 determines when to persist in-memory dirty states (e.g., map nodes in the dirty list of the metadata cache manager 312) to disk using transactions. In one aspect, the checkpoint manager 304 moves all dirty state items to a separate list for persistence, and then flushes the dirty state to disk in multiple batches by leveraging large sequential writes. By doing so, the checkpoint manager creates a checkpoint. In one aspect, the checkpoint manager 304 updates the log manager 314, described below, to record the physical address of the most recent successful checkpoint. In one aspect, if the checkpoint manager does not successfully create a new checkpoint, then it initiates a recovery request to recover the last persistent state of the data object.

In some embodiments, the log manager 314 keeps track of the logs of various operations performed on the data object. By keeping track of the logs of various operations performed on the data object, the log manager provides transactions for persistence and recovery from host crash or power outage. The logs include but are not limited to a transaction log (also referred herein as a write-ahead log), a checkpoint creation log, a checkpoint delete log, and a checkpoint delete status log. The write-ahead log contains a mixture of different entries discussed above except the checkpoint delete log, and the write-ahead log and the different entries are illustrated in FIGS. 5A-5G. Details about the checkpoint delete log are disclosed below in reference to FIGS. 6A and 6B.

Figure 4:
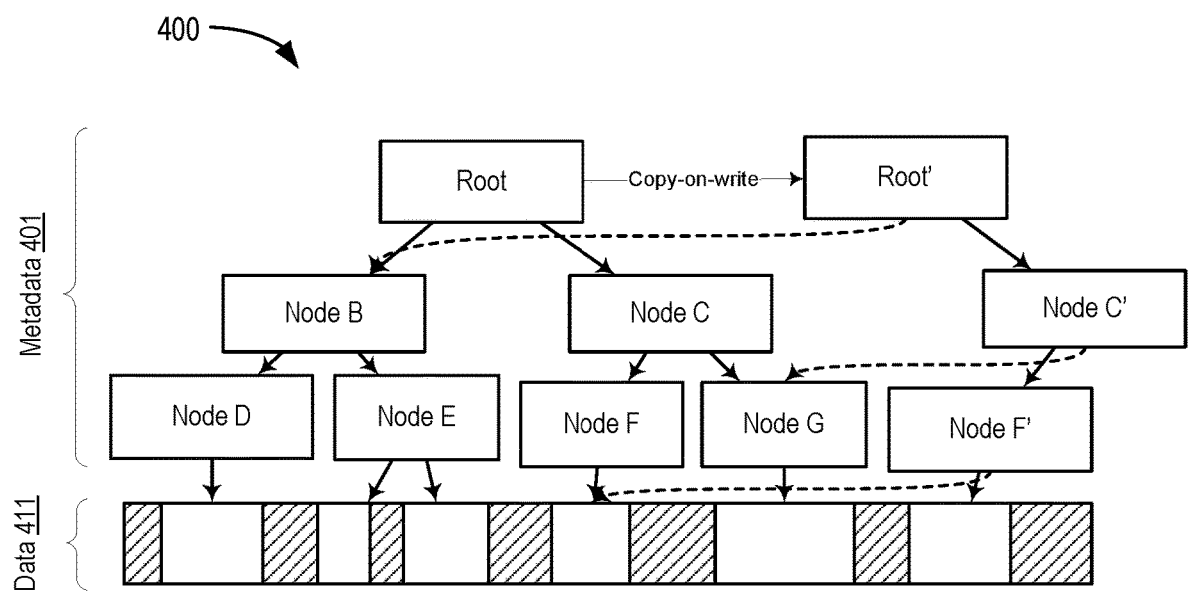
FIG. 4 is an illustration of evolution of a virtualized checkpoint protected storage system, according to embodiments of the present disclosure.

FIG. 4 is an illustration of the evolution of a data object using the virtualized snapshot protected storage system, according to an embodiment of the present disclosure. In some embodiments, a data object comprises data 411 and metadata 401, and leverages a copy-on-write B+ tree structure to organize data across checkpoints, thus minimizing the traversal cost from a checkpoint root node to a leaf node. The root node and index nodes comprise references (i.e., entries) that points to other index nodes or leaf nodes. The bottom level of the B+ tree contains leaf nodes, which have node headers and entries that record the mapping from checkpoint logical block address (LBA) to the physical extent location (e.g., physical block address (PBA)). LBAs are offsets generated for a logical address space representing storage space, and these offsets correspond to a logical representation of disk space available to a VM. PBAs are the physical locations of the disk space mapped from the LBAs. Once a new checkpoint is created, nodes in the old checkpoint (e.g., the most recent checkpoint prior to the new checkpoint) become immutable, which allows preservation of the versioned data.

In FIG. 4, the B+ tree 400 has a root node Root with two index nodes: Node B and Node C, and each index node has leaf nodes: Node B has Node D and Node E 408. Each of the leaf nodes (Node D, Node E, Node F, and Node G) correspond to unique data blocks of data 411 of the data object. The solid arrows of FIG. 4 connect private nodes or entries, and dotted arrows of FIG. 4 connect shared nodes or entries. Private nodes are nodes that referenced once in the B+ tree (e.g., Node C, Node D, Node E), and shared nodes are nodes that are referenced multiple times in the B+ tree (e.g., Node B, Node G).

In some embodiments, when an action (i.e., a write, a checkpoint) is performed on the data object, the VSAN distributed object manager 300 uses copy-on-write operations to create new nodes and entries from the versioned root to leaf node (e.g., Root'→Node F') corresponding to the action performed on the data object. As the number of checkpoints increases, the nodes of the B+ tree may contain entries that are either referenced once or multiple times, which are shown as private and shared links, respectively. In one embodiment, on an overwrite operation, the entry type may change from shared to private. The VSAN distributed object manager 300 constantly splits and merges entries for overwrite and delete operations and rebalances nodes to maintain a minimized B+ tree height property.

FIG. 5A-5G are block diagrams representing the structure of various logs and log entries of a virtualized checkpoint protected storage system, according to embodiments of the present disclosure.

FIG. 5A illustrates a write-ahead log 502 with multiple blocks $504_1$-$504_5$. The write-ahead log 502 can have any number of blocks. In one embodiment, the write-ahead log forms a circular buffer, and each block contains multiple log entries of different types and a batch sequence number (BatchNbr). The VSAN distributed object manager 300 records a last committed log record marker to identify uncommitted log entries during creating a checkpoint (also referred to as checkpointing) and recovery.

FIG. 5B illustrates a delete log 506 with multiple entries $508_1$-$508_3$. The delete log 506 can have any number of entries. In one embodiment, the delete log 506 stores the checkpoint delete request entry. Each delete log entry contains a PBA tuple illustrating the current root node PBA, an ancestor node PBA, and a descendant PBA. Each log entry also contains a unique sequence number (SeqNbr) representing the last updated timestamp sequence. Each log entry also contains a processed offset representing the deletion status of the checkpoint. The delete log 506 is also discussed in reference to FIGS. 6A and 6B.

FIG. 5C illustrates a write-ahead log entry for extending writes. In the exemplary embodiment, the write-ahead log entry 510 comprises 64 bits for LBA, 64 bits for PBA, 64 bits for length, 32 bits for checksum, 64 bits for the unique sequence number, and 128 bits for allocation information.

FIG. 5D illustrates a write-ahead log entry for extending write confirmation. In the exemplary embodiment, the write-ahead log entry 512 comprises 64 bits for a batch sequence number.

FIG. 5E illustrates a write-ahead log entry for freed PBA. In the exemplary embodiment, the write-ahead log entry 514 comprises 64 bits for freed PBA, and 64 bits for a transaction ID.

FIG. 5F illustrates a checkpoint delete log entry. The checkpoint delete status log entry contains updates of the active delete request entry in a transaction. In the exemplary embodiment, the write-ahead log entry 516 comprises 192 bits for three 64-bit PBAs (PBA tuple), 32 bits for a received status, and 64 bits for a processed offset.

FIG. 5G illustrates a write-ahead log entry 518 for internal operations. In the exemplary embodiment, the write-ahead log entry comprises data for a type of internal operation, and the data for the internal operation.

Figure 6B:
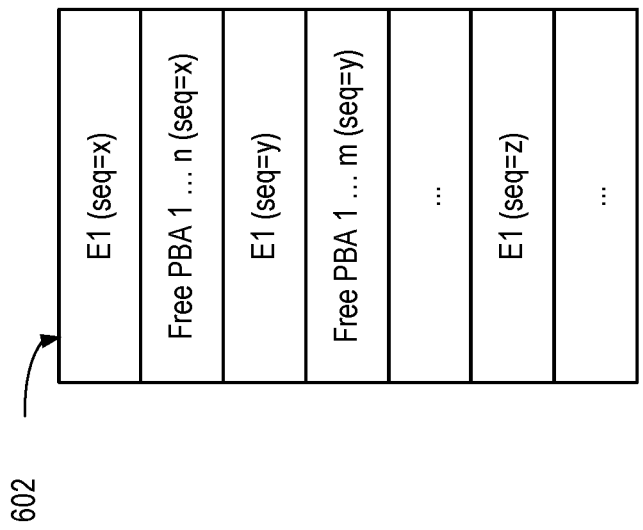
FIGS. 6A and 6B illustrate graphical representations of a checkpoint delete log and a checkpoint delete status log of a virtualized checkpoint protected storage system, according to embodiments of the present disclosure.
Figure 6A:
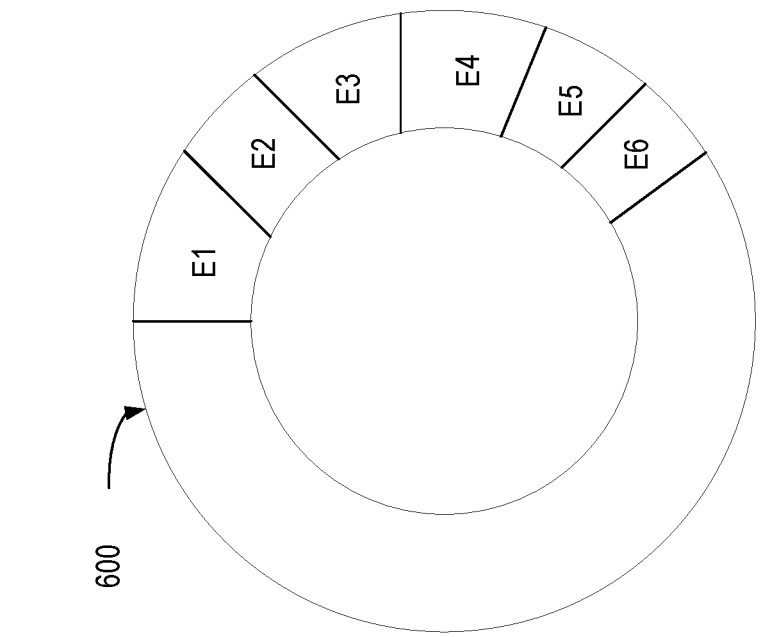

FIGS. 6A and 6B illustrate graphical representations of a checkpoint delete log and a checkpoint delete status log of a virtualized checkpoint protected storage system, according to embodiments of the present disclosure.

The checkpoint delete log 600, also shown in another graphical embodiment in FIG. 5B, is a dedicated region to preserve registered checkpoint deletion request entries as they are submitted to the VSAN distributed object manager 300 in a circular buffer. The snapshot delete entries (E1-E6) contain information of a checkpoint of the data object to be deleted (e.g., B+ tree root node, parent, descendant of the checkpoint). New checkpoint delete request entries are appended at the tail of the buffer and advance the tail marker. In the exemplary embodiment of FIG. 6A, the tail of the checkpoint delete log is E6 and the head of the checkpoint delete log is E1. The checkpoint delete process always picks a delete request entry from the head of the buffer as the active entry and deletes it asynchronously. Once the asynchronous delete of the checkpoint is complete, the head marker advances. The checkpoint delete status log 602 of FIG. 6B tracks the sequence of updates towards the active entry, as shown in FIG. 6B.

Figure 7:
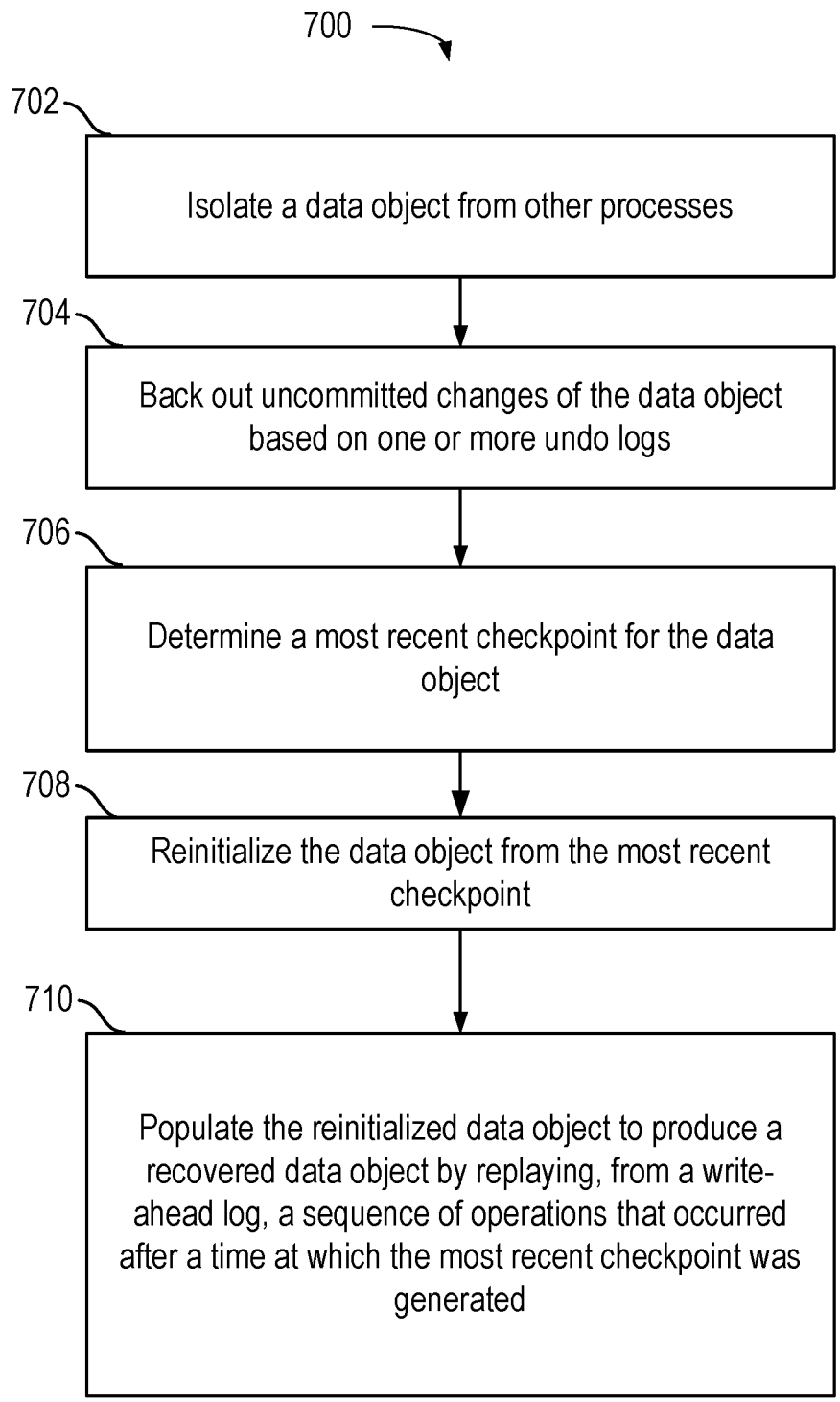
FIG. 7 is a flow diagram illustrating a method for performing a crash and failure recovery for a virtualized checkpoint protected storage system, according to embodiments of the present disclosure.

FIG. 7 is a flow diagram illustrating a method 700 for performing a crash and failure recovery on a data object for a virtualized checkpoint protected storage system, according to embodiments of the present disclosure. The data object is vulnerable to crashes and errors in the presence of hardware issues, power distribution unit (PDU) outage, and/or network issues such as partition in a virtualized environment. When a crash or error does occur, the data object may no longer be in the same state before the crash or error, so the virtualized checkpoint protected storage system needs to restore the data object to a crash-consistent state before the crash or error. Method 700 performs a crash and failure recovery on the data object after a crash or error and restores the data object to a crash-consistent state before the crash or error.

In certain embodiments, method 700 is performed by VSAN distributed object manager 300 of FIG. 3. While method 700 is described in conjunction with the systems shown in FIG. 1-6, it should be recognized that other systems may be used to perform the described methods. Method 700 may further be explained in conjunction with FIG. 8, which depicts a method embodiment using an example file system.

Method 700 begins at step 702, where VSAN distributed object manager 300 isolates the data object from other processes than the VSAN distributed object manager 300. In particular, isolating the data object prevents any I/Os from other processes, whether incoming after the isolating, pending from prior to the isolating, etc., from reaching the data object. In one embodiment, isolating the data object from other processes involves quiescing the data object to be recovered after receiving a request to perform recovery of the data object. The VSAN distributed object manager 300 quiesces the data object by aborting any outstanding operations, including checkpoint create operations, and checkpoint delete operations. Ongoing I/O requests from other clients are also aborted and provided a retriable error code so that these I/O requests can resume once recovery by the VSAN distributed object manager 300 is completed. The VSAN distributed object manager 300 sets up an exclusive barrier to prevent any other process from changing any property of the data object. By setting up the exclusive barrier, the VSAN distributed object manager 300 has put the data object in an exclusive mode. Furthermore, the VSAN distributed object manager 300 marks the data object with a recovering status marker to indicate to other processes that the data object is undergoing the recovery process, and blocks incoming I/O and control operations.

At step 704, after isolating the data object, the VSAN distributed object manager 300 starts backing out uncommitted changes of the data object based on undo logs. Uncommitted changes are updates to the data object's data and metadata that have not been included in the data object's most recent checkpoint and that have been made since the data object's most recent checkpoint. In some embodiments, the VSAN distributed object manager 300 backs out uncommitted changes by performing undo operations on the uncommitted changes, such as B+ tree changes. Because a crash or error can change the data and metadata of the data object, the current state of the object at step 704 may not match up with the data object state known by the VSAN distributed object manager 300. For example, the VSAN distributed object manager 300 could have been in the middle of creating a checkpoint (also referred to as checkpointing) the data-object when the crash or error occurred, and the VSAN distributed object manager 300, having logged that it had been checkpointing the data object in an undo log, knows to undo any changes that are not logged as committed. Also, because checkpointing flushes dirty nodes to make them clean, step 704 reverses the dirty-to-clean process and mark clean nodes as dirty again.

At step 706, the VSAN distributed object manager 300 determines a most recent checkpoint for the data object. In some embodiments, when the VSAN distributed object manager 300 commits a checkpoint, the VSAN distributed object manager 300 has a record of a checkpoint, and until the VSAN distributed object manager 300 completes creating a new checkpoint, the VSAN distributed object manager 300 uses the most recently committed checkpoint for recovering the data object. In some embodiments, the most recent checkpoint is a point-in-time checkpoint comprising of changes to the data and metadata of the data object since the second most recent checkpoint.

At step 708, the VSAN distributed object manager 300 reinitializes the data object from the most recent checkpoint so that the data and metadata of the data object matches the data and metadata of the data object at the most recent checkpoint. In some embodiments, reinitializing the data object includes reading the checkpoint id, which is recorded by the log manager 314, and determining an object generation number for the data and metadata of the data object.

When the system creates a checkpoint, an object generation number is created and the data store and metadata store of the data object are also checkpoint-ed. The data store is where the VM client data (also referred herein as data object data) is located, and the metadata store stores the persistent B+ tree. During the process of checkpointing the data object, a crash can happen while one store has been committed and the other store has not been committed, and in light of this scenario, the VSAN distributed object manager 300 uses the checkpoint id to determine whether a particular store has been committed.

In some embodiments, each store (data and metadata) uses two rotating headers. Each rotating header is associated with a checkpoint id, so that once the VSAN distributed object manager 300 creates a checkpoint, the VSAN distributed object manager 300 writes the checkpoint id in one header. Upon a successful write to the header, the system rotates to the next header, and when the VSAN distributed object manager 300 creates a new checkpoint, the VSAN distributed object manager 300 uses the next header. Again, upon a successful write to this next header, the VSAN distributed object manager 300 rotates back to the first header. So, the VSAN distributed object manager 300 is always rotating from one header to the other header to ensure that the VSAN distributed object manager 300 has an accurate and uncorrupted checkpoint of the data object.

At step 710, the VSAN distributed object manager 300 populates the reinitialized data object to produce a recovered data object by replaying, from a write-ahead log, a sequence of operations that occurred after a time at which the most recent checkpoint was generated, wherein replaying the sequence of operations recovers data and metadata of the data object. In some embodiments, during the recovery method 700, the VSAN distributed object manager 300 periodically checkpoints data object changes to persistent storage to save intermediate recovered results, so that the system preserves the state of the data object during the recovery process. In some cases, the system needs to handle large uncommitted write entries, which depend on how much the VM client writes. Accordingly, the VSAN distributed object manager 300 periodically creates checkpoints for the metadata that has replayed. If the VSAN distributed object manager 300 has no more remaining log entries of the write-ahead log (also referred herein as a transaction log) to replay, then the VSAN distributed object manager 300 initiates a checkpointing process to synchronize the recovered B+ tree metadata to disk. After synchronizing to disk, the VSAN distributed object manager 300 has committed all the entries of the write-ahead log and is in a crash consistent state. A crash consistent state is defined as a state where the B+ tree accurately represents the current state of the data object, and the B+ tree does not have any nodes that reference two different data blocks or an allocated data block which is not referenced by any valid B+ tree node.

In some embodiments, once the system finishes forming a recovered data object, the VSAN distributed object manager 300 starts the clean-up phase of the recovery process. In these embodiments, the clean-up phase includes the VSAN distributed object manager 300 releasing the exclusive barrier on the data object, so that ongoing I/O operations can resume. The VSAN distributed object manager 300 removes the recovering status from the data object and resumes service for the I/O requests to checkpoint control path operations (e.g., control operations on the data object, checkpoint-related control operations).

Figure 8:
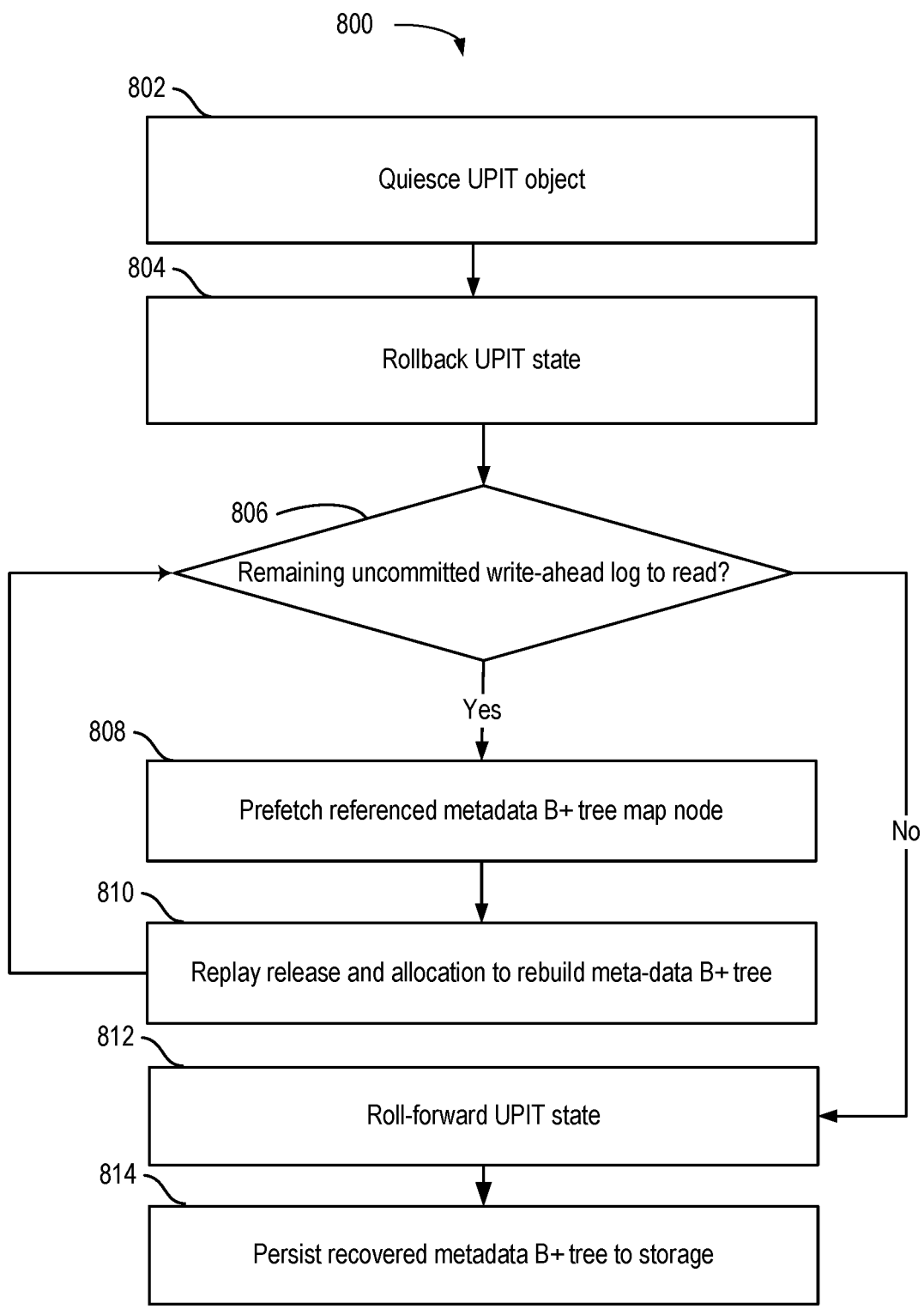
FIG. 8 is a flow diagram illustrating an exemplary method for performing a crash recovery, according to embodiments of the present disclosure.

FIG. 8 is a flow diagram illustrating a method for performing a crash recovery, according to embodiments of the present disclosure. Like method 700, method 800 is described in conjunction with the systems shown in FIG. 1-6 but other system can also perform the described method. Method 600 provides a detailed example of method 700 with regard to a point-in-time data object.

Method 800 begins at step 802, where the VSAN distributed object manager 300 quiesces the point-in-time data object. Once the data object is quiesced, at step 804, the VSAN distributed object manager 300 performs a rollback of the data object to the most recent checkpoint of the data object. At step 806, the VSAN distributed object manager 300 determines whether the write-ahead log has any uncommitted write entries. If there are uncommitted write entries that have not been read from the write-ahead log, then, at step 808, the VSAN distributed object manager 300 pre-fetches the metadata B+ tree map node of one of the uncommitted write entries of the write-ahead log. An example pre-fetch method is provided with FIG. 11. Once the referenced metadata B+ tree map node is pre-fetched, at step 810, the system replays the release and allocation of the uncommitted write before looping back to determine whether there are any more uncommitted write entries that have not been read from the write-ahead log. This process continues until there are no more uncommitted write-ahead log entries to read. At step 812, the VSAN distributed object manager 300 rolls-forward the point-in-time data object. Roll-forward means changing the data object to when the data object is finished with the recovery process, and the recovered data object is equivalent to what the data object was if it did not experience a failure or crash. When the object manager 300 rolls-forward the data object, it computes the amount of space allocated or reclaimed between the recovered data object and the checkpoint last indicated as successful, and then the object manager 300 makes appropriate changes to its various components (e.g., adjust the allocation marker in the space manager). At 814, the VSAN distributed object manager 300 persists the recovered metadata B+ tree to storage.

Figure 9:
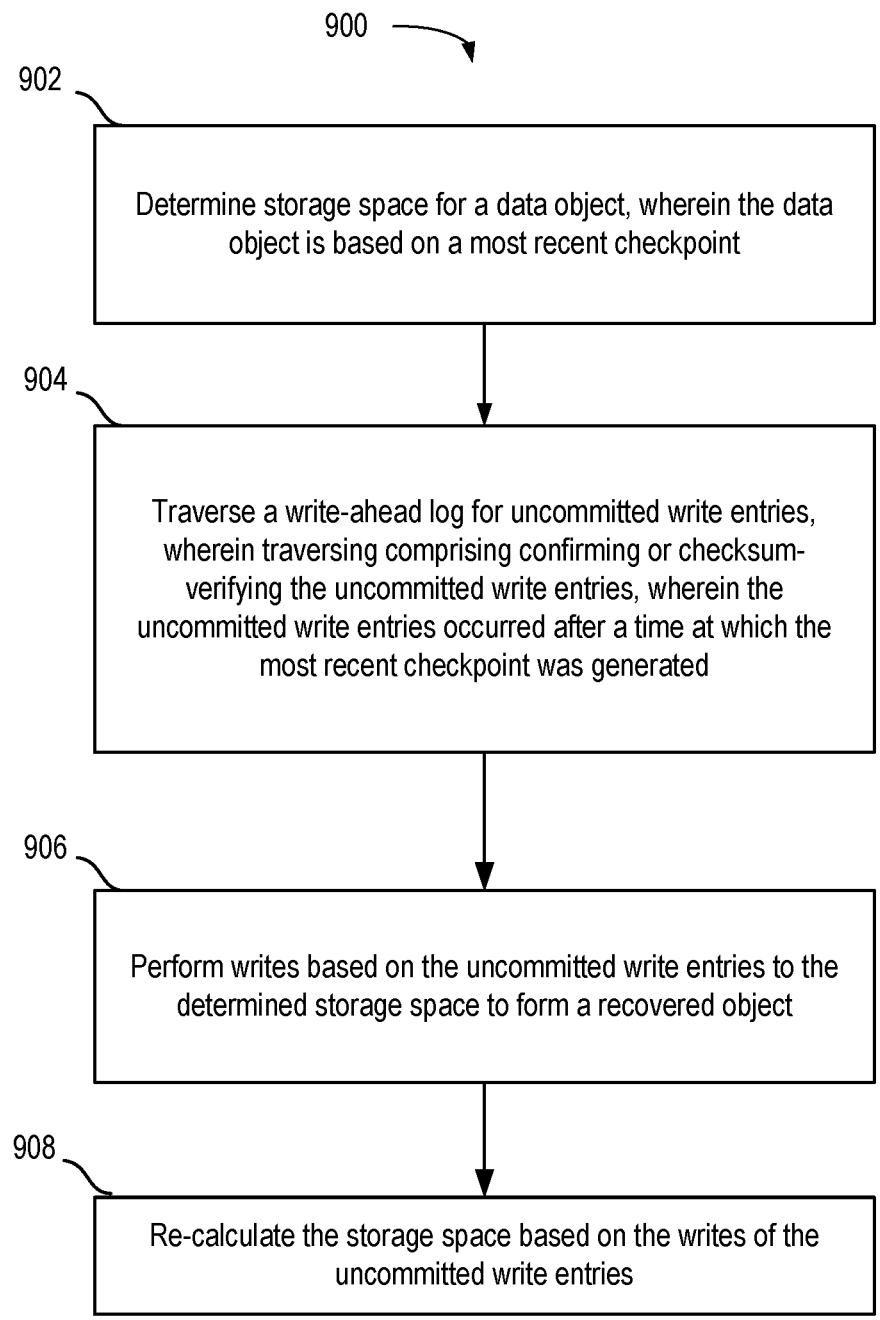
FIG. 9 is a flow diagram illustrating a method for performing a crash and failure recovery for a virtualized checkpoint protected storage system, according to embodiments of the present disclosure.

FIG. 9 is a flow diagram illustrating a method 900 for performing a crash and failure recovery for a virtualized checkpoint protected VSAN distributed object manager, according to embodiments of the present disclosure. While method 900 is described in conjunction with the systems shown in FIG. 1-6, it should be recognized that other systems may be used to perform the described methods. Method 900 may further be explained in conjunction with FIGS. 6A and 6B, which illustrate graphical representations of the checkpoint delete log and checkpoint delete status log, and FIG. 8, which depicts a method embodiment using an example file system. In some embodiments, the VSAN distributed object manager 300 uses the method 900 on a reinitialized object.

Method 900 begins at step 902, where the VSAN distributed object manager 300 determines storage space for the data object, wherein the data object is based on a most recent checkpoint.

In some embodiments, determining the storage space for the data object includes reading the checkpoint delete status log (i.e., subpart of the write-ahead log) and the active entry in the checkpoint delete log into memory. Because checkpoint deletion and creation can happen simultaneously on the data object, the VSAN distributed object manager 300 is also freeing storage space and allocating storage space simultaneously from the garbage collector's released space, from unallocated disk storage, or from reclaimed space from checkpoint delete operations.

In some embodiments, the VSAN distributed object manager 300 determines the storage space from checkpoint delete operations by comparing the checkpoint delete status log and the active entry in the checkpoint delete log. As mentioned, the log manager 314 of the VSAN distributed object manager 300 records the status of transactions performed on the data object in the active entry in the checkpoint delete log and records uncommitted log entries per log block in a checkpoint delete status log. The checkpoint delete status log represents the sequence of uncommitted updates to the active checkpoint delete request entry per transaction, as discussed previously in reference to FIG. 6B. A checkpoint delete update is committed and performed on the active entry in the checkpoint delete log with atomic write (i.e., a write either succeeded with updated content or failed with the original content unchanged).

The checkpoint delete operations periodically release a set of physical block address (PBA) and the VSAN distributed object manager 300 updates the checkpoint delete log, which logs the progress of the committed checkpoint delete operations. In order to release PBA, the VSAN distributed object manager 300 locates a delete entry sequence number stored in the checkpoint delete status log. This delete entry sequence number is associated with PBA that were freed by the checkpoint delete operations, and also represents a part of the B+ tree that has been deleted by the checkpoint delete operations and accordingly the PBA associated with the deleted part of the B+ tree. The sequence number is incremented when the update corresponding to the active checkpoint delete entry succeeds.

In some embodiments, the VSAN distributed object manager 300 continues the step of determining the storage space for the data object by traversing the checkpoint delete status log starting from the checkpoint delete status log entry with the lowest sequence number. The VSAN distributed object manager 300 then locates the freed PBA corresponding to the checkpoint delete log entry with the lowest sequence number. As the checkpoint delete log is traversed, if a checkpoint delete log entry has a second lowest sequence number greater than the lowest sequence number, then the VSAN distributed object manager 300 releases the space occupied by the PBA corresponding to the lowest sequence number, sets the larger sequence number to the lowest sequence number, and then repeats this find-and-release process. The VSAN distributed object manager 300 repeats this process until the checkpoint delete status log has been completely traversed.

In some embodiments, the VSAN distributed object manager 300 compares the most recent checkpoint delete status log entry tracked in the checkpoint delete status log against the active checkpoint delete entry in the checkpoint delete log. If the active checkpoint delete log entry in the checkpoint delete log is different from the most recent checkpoint delete entry tracked by the checkpoint delete status log, then the VSAN distributed object manager 300 has already deleted a part of the B+ tree. The VSAN distributed object manager 300 goes on to determine the sequence numbers corresponding to the deleted part of the B+ tree, and frees the PBA corresponding to the sequence numbers of the deleted part of the B+ tree. If the active checkpoint delete entry in the checkpoint delete log is the same as the most recent tracked checkpoint delete entry in the checkpoint delete status log, then the VSAN distributed object manager 300 does not release any PBA because the operation of releasing these PBAs has not been committed. In some embodiments, the system's comparison of the two logs is similar to a two-phase commit protocol because the system ensures the release of PBA by checking the checkpoint delete status log, releasing PBA according to the updates of the checkpoint delete status log, and checking the active entry in checkpoint delete log.

In further embodiments, if the checkpoint delete log is empty, the VSAN distributed object manager 300 releases free space corresponding to the freed PBA log entries in the write-ahead log with the largest sequence number.

In some embodiments, once the VSAN distributed object manager 300 has completed determining the storage space of the data object, the VSAN distributed object manager 300 creates a new B+ tree root node for recovery replay of the data object. The recovery replay represents redo changes for recovering data and metadata of the data object.

At step 904, the VSAN distributed object manager 300 traverses the write-ahead log for uncommitted write entries, which occurred after a time at which the most recent checkpoint was generated. Uncommitted write entries include uncommitted extending writes to the metadata of the data object. An extending write updates metadata, typically in the form of changes to the B+ tree of the data object (e.g., inserting nodes, deleting nodes, rebalancing). For each extending write, the VSAN distributed object manager 300 creates an extending write log entry, and an extending write confirmed log entry. The VSAN distributed object manager 300 writes the extending write log entry to disk when the log entry for that particular write is logged, and when the write is logged, the VSAN distributed object manager 300 can send an acknowledgement to the VM client. For the extending write confirmation log entry, the VSAN distributed object manager 300 also releases a range lock to resume other process from performing mutable operations on the PBA range. For example, for an extending write of LBA 0 with a length of 8192, another extending write can happen on LBA 4096 with a length 4096. In this case, the first write will acquire a range lock from 0 to 8192. The second write cannot start because it requires range of 4096-8192 which overlaps with the first write and the first write has the lock. This mechanism ensures that there is only one writer at a time for the same range of data so that there won't be interleaved content update issues.

In some embodiments, traversing the write-ahead log includes confirming or check-sum verifying the uncommitted write entries so the system can safely replay writes on top of the B+ tree or perform any mutation to the B+ tree. Confirming uncommitted write entries comprises comparing the extending write log against the extending write confirmation log stored in the log manager 314, and if the extending write log entry is in an entry in the extending write confirmation log, then the VSAN distributed object manager 300 replays the corresponding write to the B+ tree map node. The extending write confirmation log stored in the log manager 314 comprises extending write confirmation entries of successful writes, and each extending write confirmation entry of the extending write confirmation log corresponds to a successful write entry in the extending write log and a successful data write because the extending write confirmation log entry is issued only when both writes succeeded. In some embodiments, the extending write confirmation log is used to speed up the recovery process by confirming successful extending write entries against the extending write entries of the extending write log.

If the extending write log entry is not an entry in the extending write confirmation log, then the VSAN distributed object manager 300 verifies the extending write log entry using checksums. The VSAN distributed object manager 300 initiates a read to the PBA region associated with the write log entry to read the content of the PBA region to memory and computes a checksum of the write log entry. The VSAN distributed object manager 300 compares this computed checksum with the checksum of the extending write log entry. If the checksums are the same, then VSAN distributed object manager 300 performs the replay of the extending write log entry to the B+ tree map node. If the checksums are different, then the VSAN distributed object manager 300 does not perform the replay of the extending write log entry.

In some embodiments, the VSAN distributed object manager 300 handles the interplay of allocating space and freeing space. In these embodiments, the system may be allocating space that was just freed from the checkpoint delete process. So, once the VSAN distributed object manager 300 replays an acknowledged write, the system examines a recovered free PBAs from the checkpoint delete process. If the space corresponding to the acknowledge write is on the recovered free space log, and then the system removes those PBAs from the recovered free PBAs, to prevent duplicate allocation.

At step 906, the VSAN distributed object manager 300 replays writes based on the uncommitted write entries to the determined storage to form a recovered object.

At step 908, the VSAN distributed object manager 300 re-calculates the storage space based on the writes of the uncommitted write entries.

In some embodiments, the VSAN distributed object manager 300 periodically persists the B+ tree to underlying storage. In these embodiments, the VSAN distributed object manager 300 persists the B+ tree if there are too many dirty nodes (e.g., above a threshold number of dirty nodes) during the replay process, and the VSAN distributed object manager 300 computes the start and end of the free lists. The space manager comprises a marker representing where space is allocated and comprises a free list start and end marker. In some embodiments, the free list is a circular buffer, and once the checkpoint delete process frees PBAs, the VSAN distributed object manager 300 persists the information about the freed PBA to the free list and updates the start and end of the circular buffer. The system also determines where the new markers are for the free list start and end once the VSAN distributed object manager 300 flushes the PBAs to the disk.

In some embodiments, the VSAN distributed object manager 300 updates the markers of the allocated PBAs and the offset of the free list. In some embodiments, the space manager updates the corresponding headers.

In some embodiments, the VSAN distributed object manager 300 checks whether the set of allocations and the set of deallocations are exclusive. By checking, the VSAN distributed object manager 300 validates the recovery process for the data object. Generally, the set of allocations and set of deallocations is exclusive. However, if the set of allocations and the set of deallocations is not exclusive (e.g., via hardware corruption), the VSAN distributed object manager 300 marks the recovery of the data object as failed, and correspondingly marks the data object as decommissioned for inspection as a way to prevent further damage of the object.

In some embodiments, the system completes the replay process by persisting all recovered information to disk.

Figure 10:
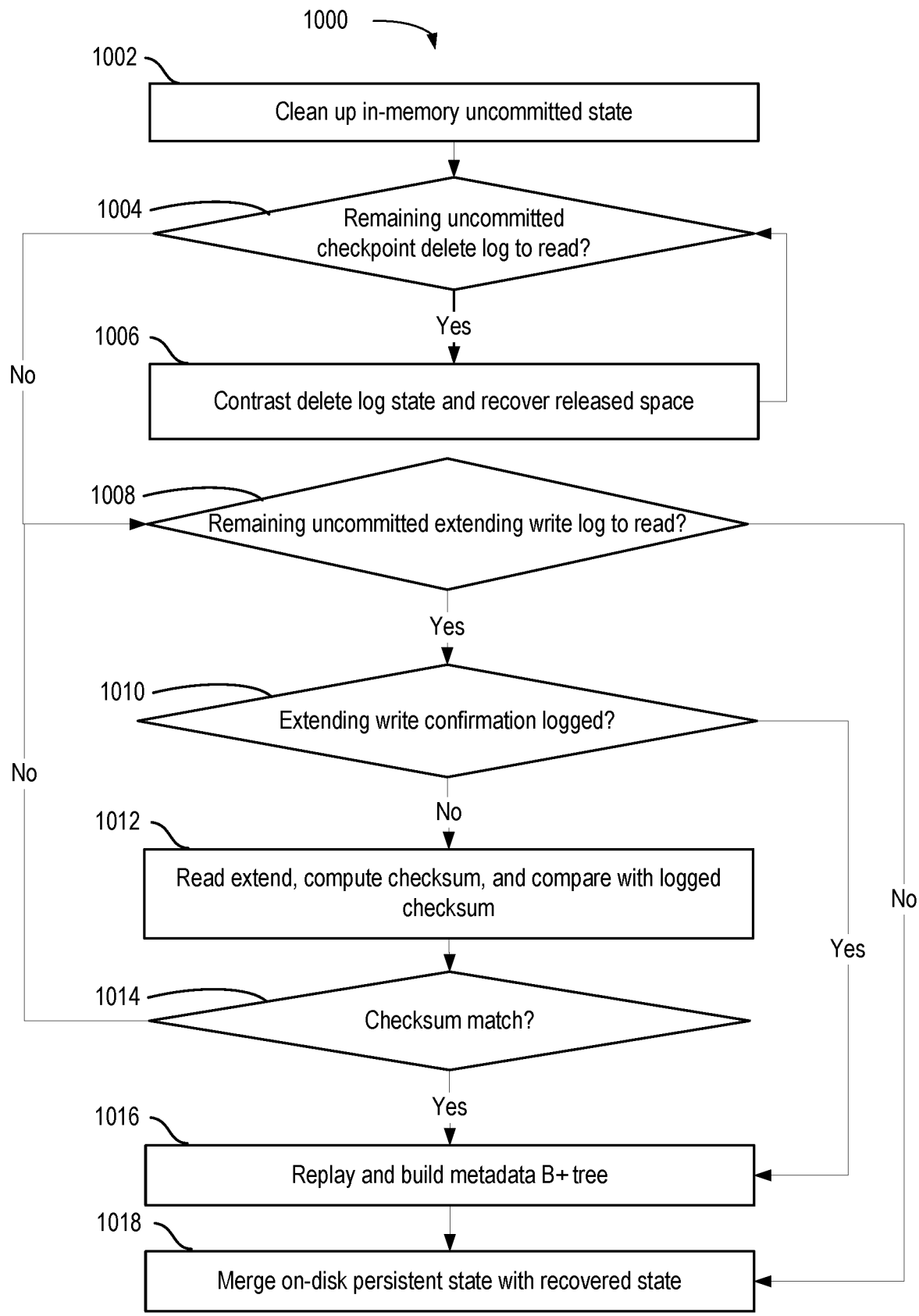
FIG. 10 is a flow diagram illustrating an exemplary method for performing a crash recovery, according to embodiments of the present disclosure.

FIG. 10 is a flow diagram illustrating a method for performing a crash recovery, according to embodiments of the present disclosure. Like method 900, method 1000 is described in conjunction with the systems shown in FIG. 1-4 but other system can also perform the described method. Method 1000 provides a detailed example of method 900 with regard to a point-in-time data object.

Method 1000 beings at step 1002, where the VSAN distributed object manager 300 cleans up the in-memory uncommitted state of the data object. At step 1004, the VSAN distributed object manager 300 looks at the uncommitted checkpoint delete status log for any unread entries. If there are unread entries, then at step 1006, the VSAN distributed object manager 300 contrasts the delete log state with an unread entry of the checkpoint delete status log and recovers the released space based on the entry of the checkpoint delete log. The VSAN distributed object manager 300 continues to contrast the delete log state and uncommitted checkpoint delete log entry until there are no more entries to read in the uncommitted checkpoint delete status log. Once there are no more entries of the uncommitted checkpoint delete status log entry to read, then at step 1008, the system looks at the extending write log for unread entries. If there are unread entries, then at step 1010, the system looks at the extending write confirmation log for an entry corresponding to the unread entry of the extending write log. If the extending write confirmation log does not have an entry corresponding to the unread entry, then at step 1012, the system reads the extending write, computes a checksum based on the extending write of the unread entry, and compares the computed checksum with a checksum logged in the extending write log entry. At step 1014, the VSAN distributed object manager 300 compares the checksums, and if they do not match, then the VSAN distributed object manager 300 does not perform the extending write replay of the unread entry to the data object because the VSAN distributed object manager 300 has determined that the extending write would create inaccuracies in the metadata and/or data of the data object. Then, the system goes on to any other unread entries of the uncommitted extending write logs. However, if the checksums match, at step 1016, the system replays the uncommitted extending write and builds the metadata B+ tree based on the LBA of the extending write. Similarly, if the unread entry of the extending write log was logged in the extending write confirmation log, then the VSAN distributed object manager 300 also replays the extending write at step 1016. Once there are no more unread entries of the uncommitted extending write log, then the VSAN distributed object manager 300 has recovered the data object and at step 1018, merges the recovered state of the data object with the on-disk persistent state.

Figure 11:
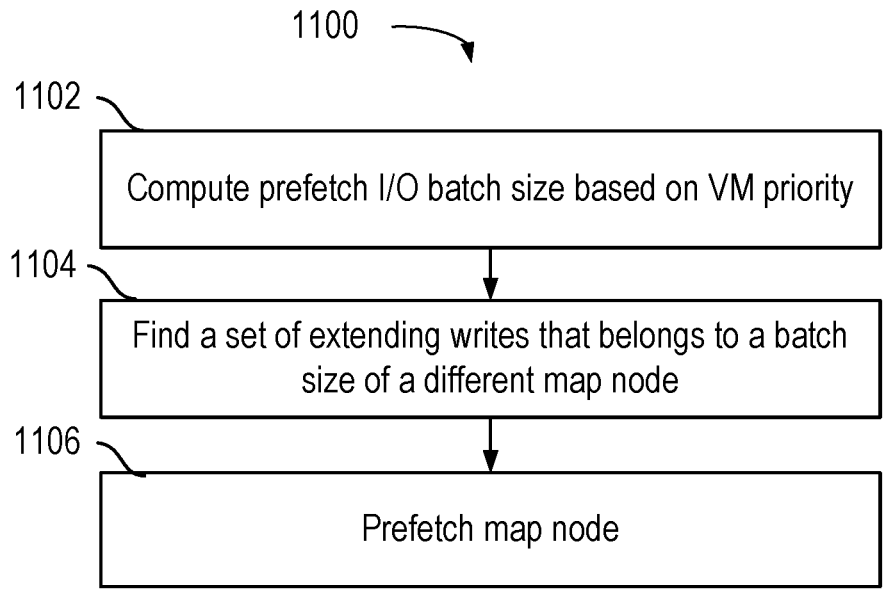
FIG. 11 is a flow diagram illustrating an exemplary method for a pre-fetch operation, according to embodiments of the present disclosure.

FIG. 11 is a flow diagram illustrating a method for a pre-fetch operation, according to embodiments of the present disclosure. The pre-fetch operation involves pre-fetching the B+ tree nodes that are to be used during the replay phase of recovering the metadata (i.e., B+ tree) of the data object, so that the VSAN distributed object manager 300 does not cause cache misses during the replay phase.

Method 1100 begins at step 1102, where the VSAN distributed object manager 300 computes pre-fetch I/O batch size based on VM priority.

At step 1104, the VSAN distributed object manager 300 finds a set of extending writes that belongs to a batch size of a different map node.

At step 1106, the VSAN distributed object manager pre-fetches the map node.

Figure 12:
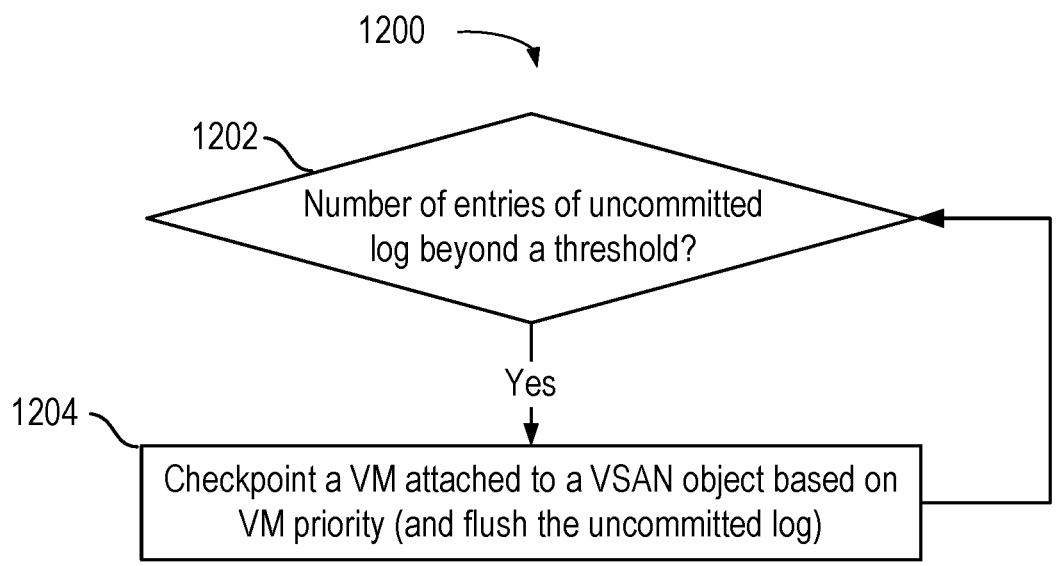
FIG. 12 is a flow diagram illustrating an exemplary method for a checkpoint operation, according to embodiments of the present disclosure.

FIG. 12 is a flow diagram illustrating a method for a checkpoint operation, according to embodiments of the present disclosure.

Method 1200 begins at 1202, where the VSAN distributed object manager 300 determines if the number of entries of an uncommitted log exceeds a threshold.

At step 1204, upon determining that the number of entries of the uncommitted log exceeds the threshold, the VSAN distributed object manager 300 checkpoints a VM attached to a VSAN object based on VM priority. In one embodiment, the VSAN distributed object manager 300 flushes the uncommitted log when checkpointing. As such, after checkpointing, the uncommitted log has no more entries. By flushing the uncommitted log when checkpointing, the VSAN distributed object manager 300 avoids repeatedly performing checkpoint operations.

After checkpointing the VM (and flushing the uncommitted log), the VSAN distributed object manager 300 returns to step 1202, where it continues to check whether the number of entries in the uncommitted log has exceeded the threshold.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be implemented as useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, a Solid-State Disk (SSD), network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method for recovering content, comprising:
   isolating a data object from processes other than a manager process;
   backing out uncommitted changes of the data object based on one or more undo logs;
   determining a most recent checkpoint for the data object;
   reinitializing the data object from the most recent checkpoint to produce a reinitialized data object; and
   populating the reinitialized data object to produce a recovered data object by replaying, from a write-ahead log, a sequence of operations that occurred after a time at which the most recent checkpoint was generated, wherein replaying the sequence of operations recovers data and metadata of the data object.

2. The method of claim 1, wherein the sequence of operations comprises operations corresponding to uncommitted log entries of the write-ahead log.

3. The method of claim 1, further comprising: checkpointing the data object to persistent storage after a subset of the sequence of operations has replayed.

4. The method of claim 1, wherein replaying the sequence of operations comprises:
   releasing a first amount of storage space for the data object based on a comparison of entries of the write-ahead log to entries of a delete log, wherein releasing comprises indicating, on a free list, space available for writing;
   releasing a second storage space for the data object by traversing the write-ahead log for uncommitted write entries and confirming, against a confirmation log, or checksum-verifying, against checksums of the uncommitted write entries and of referenced storage space of the uncommitted write entries, the uncommitted write entries, wherein the uncommitted write entries occurred after a time at which the most recent checkpoint was generated, and wherein confirmed and checksum-verified uncommitted write entries are to be replayed; and
   calculating freed storage space based on the released first storage space and the released second storage space for the confirmed and checksum-verified uncommitted write entries.

5. The method of claim 4, wherein the comparison of the write-ahead log to the delete log comprises correlating entries of freed physical block addresses listed on a free list to entries of the delete log comprising entries of freed storage space from checkpoint delete operations.

6. The method of claim 4, wherein releasing the first amount of storage space comprises releasing storage space corresponding to a physical block address indicated in either the delete log or the write-ahead log but not both the delete log and the write-ahead log.

7. The method of claim 1, further comprising: checkpointing the data object when a number of uncommitted log entries of the write-ahead log exceeds one or more thresholds.

8. A non-transitory computer-readable storage medium embodying computer program instructions for recovering content for an object, the computer program instructions implementing a method, the method comprising:
   isolating a data object from other processes other than a manager process;
   backing out uncommitted changes of the data object based on one or more undo logs;
   determining a most recent checkpoint for the data object;
   reinitializing the data object from the most recent checkpoint to produce a reinitialized data object; and
   populating the reinitialized data object to produce a recovered data object by replaying, from a write-ahead log, a sequence of operations that occurred after a time at which the most recent checkpoint was generated, wherein replaying the sequence of operations recovers data and metadata of the data object.

9. The non-transitory computer-readable storage medium of claim 8, wherein the sequence of operations comprises operations corresponding to uncommitted log entries of the write-ahead log.

10. The non-transitory computer-readable storage medium of claim 8, wherein the method further comprises: checkpointing the data object to persistent storage after a subset of the sequence of operations has replayed.

11. The non-transitory computer-readable storage medium of claim 8, wherein replaying the sequence of operations comprises:
   releasing a first amount of storage space for the data object based on a comparison of entries of the write-ahead log to entries of a delete log, wherein releasing comprises indicating, on a free list, space available for writing;
   releasing a second storage space for the data object by traversing the write-ahead log for uncommitted write entries and confirming, against a confirmation log, or checksum-verifying, against checksums of the uncommitted write entries and of referenced storage space of the uncommitted write entries, the uncommitted write entries, wherein the uncommitted write entries occurred after a time at which the most recent checkpoint was generated, and wherein confirmed and checksum-verified uncommitted write entries are to be replayed; and calculating freed storage space based on the released first storage space and the released second storage space for the confirmed and checksum-verified uncommitted write entries.

12. The non-transitory computer-readable storage medium of claim 11, wherein the comparison of the write-ahead log to the delete log comprises correlating entries of freed physical block addresses listed on a free list to entries of the delete log comprising entries of freed storage space from checkpoint delete operations.

13. The non-transitory computer-readable storage medium of claim 11, wherein releasing the first amount of storage space comprises releasing storage space corresponding to a physical block address indicated in either the delete log or the write-ahead log but not both the delete log and the write-ahead log.

14. The non-transitory computer-readable storage medium of claim 8, wherein the method further comprises: checkpointing the data object when a number of uncommitted log entries of the write-ahead log exceeds one or more thresholds.

15. A system, comprising:
a processor; and
non-transitory computer-readable storage medium embodying computer program instructions for recovering content for an object, the computer program instructions implementing a method, the method comprising:
  isolating a data object from other processes other than a manager process;
  backing out uncommitted changes of the data object based on one or more undo logs;
  determining a most recent checkpoint for the data object;
  reinitializing the data object from the most recent checkpoint to produce a reinitialized data object; and
  populating the reinitialized data object to produce a recovered data object by replaying, from a write-ahead log, a sequence of operations that occurred after a time at which the most recent checkpoint was generated, wherein replaying the sequence of operations recovers data and metadata of the data object.

16. The system of claim 15, wherein the sequence of operations comprises operations corresponding to uncommitted log entries of the write-ahead log.

17. The system of claim 15, wherein the method further comprises: checkpointing the data object to persistent storage after a subset of the sequence of operations has replayed.

18. The system of claim 15, wherein replaying the sequence of operations comprises:
releasing a first amount of storage space for the data object based on a comparison of entries of the write-ahead log to entries of a delete log, wherein releasing comprises indicating, on a free list, space available for writing;
releasing a second storage space for the data object by traversing the write-ahead log for uncommitted write entries and confirming, against a confirmation log, or checksum-verifying, against checksums of the uncommitted write entries and of referenced storage space of the uncommitted write entries, the uncommitted write entries, wherein the uncommitted write entries occurred after a time at which the most recent checkpoint was generated, and wherein confirmed and checksum-verified uncommitted write entries are to be replayed; and
calculating freed storage space based on the released first storage space and the released second storage space for the confirmed and checksum-verified uncommitted write entries.

19. The system of claim 18, wherein the comparison of the write-ahead log to the delete log comprises correlating entries of freed physical block addresses listed on a free list to entries of the delete log comprising entries of freed storage space from checkpoint delete operations.

20. The system of claim 18, wherein releasing the first amount of storage space comprises releasing storage space corresponding to a physical block address indicated in either the delete log or the write-ahead log but not both the delete log and the write-ahead log.

* * * * *